(12) United States Patent
Liu

(10) Patent No.: US 8,521,792 B2
(45) Date of Patent: Aug. 27, 2013

(54) RATE MULTIPLICATION METHOD

(75) Inventor: Chuan-Wei Liu, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 996 days.

(21) Appl. No.: 12/371,801

(22) Filed: Feb. 16, 2009

(65) Prior Publication Data
US 2009/0150466 A1 Jun. 11, 2009

Related U.S. Application Data

(63) Continuation of application No. 10/984,533, filed on Nov. 8, 2004, now Pat. No. 7,512,644.

(30) Foreign Application Priority Data
Nov. 7, 2003 (TW) .............................. 92131184 A

(51) Int. Cl.
*G06F 7/52* (2006.01)
*H03K 21/00* (2006.01)

(52) U.S. Cl.
USPC ........................................... 708/103; 377/48

(58) Field of Classification Search
USPC ..................... 708/103; 377/47, 48
See application file for complete search history.

(56) References Cited

U.S. PATENT DOCUMENTS

| | | | | | |
|---|---|---|---|---|---|
| 3,733,475 | A | * | 5/1973 | Haeusler et al. | 708/103 |
| 3,798,564 | A | * | 3/1974 | Langham | 331/1 A |
| 3,970,954 | A | * | 7/1976 | Even | 331/53 |
| 4,704,723 | A | * | 11/1987 | Markland | 377/39 |
| 5,185,770 | A | * | 2/1993 | Tomozawa | 377/47 |
| 5,754,615 | A | * | 5/1998 | Colavin | 377/47 |

* cited by examiner

*Primary Examiner* — Chuong D Ngo
(74) *Attorney, Agent, or Firm* — J.C. Patents

(57) ABSTRACT

The present invention discloses a rate multiplication method for counting a sequence of original pulse signals and outputting a target pulse signal. In this method a comparison data and original pulse signal sequence is received. The original pulse signal sequence is counted in order to obtain a pulse count. Comparing the pulse count and the comparison data. If the pulse count is equal to the comparison data, a corresponding original pulse signal is outputted as the target pulse signal. Reset and recount the pulse count, and obtain which repeatedly. In this present invention the pulse count and the pulse interval between the target pulse signals can be determined freely according to a rate.

11 Claims, 4 Drawing Sheets

RATE MULTIPLICATION METHOD

CROSS-REFERENCE TO RELATED APPLICATION

This application is a continuation of a prior application Ser. No. 10/984,533, filed Nov. 8, 2004, now issued as U.S. Pat. No. 7,512,644. The prior application Ser. No. 10/984,533 claims the priority benefit of Taiwan application serial no. 92131184, filed on Nov. 7, 2003. The entirety of each of the above-mentioned patent applications is hereby incorporated by reference herein and made a part of this specification.

BACKGROUND OF THE INVENTION

1. Field of the Invention

This invention generally relates to a rate multiplication method, and more particularly to a rate multiplication method for generating a target pulse signal by transforming an original pulse signal sequence according to a rate n/m.

2. Description of Related Art

In electronic circuit application, a signal frequency f is usually multiplied by a rate n/m, being smaller than 1, in order to obtain a smaller frequency signal. This operation is referred to as rate multiplication. For example, multiply a pulse signal of 10 MHz frequency by 3/10, a 3 MHz-frequency pulse signal is obtained. Visually, retaining three out of the ten of the pulse signals implements rate multiplication therein.

In some conventional method, n pulse signals are selected arbitrarily out of m pulse signals by hardware circuitry; in some other conventional method, n pulse signals with equal space or unequal space are selected via hardware circuitry out of m pulse signals. Relative detail can be referred to U.S. Pat. No. 4,541,408 and US patent 2003/0058052.

However, the hardware circuitry in foregoing method is designed backwards from final waveforms, which causes substantial burden to circuit designers. In addition, the n pulse signals are assigned either equally spaced or unequally spaced, where pulse interval is not adjustable upon requirement, so that usage flexibility is relatively lower.

SUMMARY OF THE INVENTION

The present invention provides a rate multiplication method, so that both numerator and denominator of a rate n/m are adjustable. In addition, a time spacing between output pulse signal and adjacent output pulse signal is determined upon user's choice in the present invention.

The present invention provides a rate multiplication method for generating a target pulse signal by transforming an original pulse signal sequence according to a rate n/m. The rate multiplication method comprises: receiving the original pulse signal sequence; receiving a comparison data including a plurality of interval values, wherein a quantity of the interval values is equal to a numerator of the rate n/m, and a sum of the interval values is equal to a denominator of the rate n/m; and generating the target pulse signal by selectively outputting n pulses from every m pulses of the original pulse signal sequence according to the interval values. The length of interval between adjacent pulses of the target pulse signal is integral multiple of that of the original pulse signal.

According to one preferred embodiment of this present invention, the length of interval between adjacent pulses of the target pulse signal is determined according to the interval values.

According to one preferred embodiment of this present invention, the comparison data is selected from a plurality of sets of comparison data according to the rate n/m, and each of the sets of comparison data provides interval values for a possible combination of n and m.

According to one preferred embodiment of this present invention, the selected set of comparison data is selected further according to a selecting signal.

According to one preferred embodiment of this present invention, the rate multiplication method further comprises receiving a modifying signal for modifying the comparison data.

According to one preferred embodiment of this present invention, a pulse width of the target pulse signal is substantially equal to that of the original pulse signal sequence.

The present invention also provides a rate multiplication method for counting an original pulse signal sequence and outputting a target pulse signal. The rate multiplication method comprises receiving a comparison data; receiving the original pulse signal sequence; counting the original pulse signal sequence, for obtaining a pulse count; and comparing the pulse count and the comparison data. When the pulse count is equal to the comparison data, part of the original pulse signal sequence corresponding to the comparison data is outputted as the target pulse signal, and the pulse count is reset and recounted to obtain the pulse count and the corresponding target pulse signal again. The length of interval between adjacent pulses of the target pulse signal is integral multiple of that of the original pulse signal.

According to one preferred embodiment of this present invention, the comparison data comprises a plurality of interval values, the step of comparing the pulse count and the comparison data comprises selecting one of the interval values and comparing with the pulse count, and the pulse count being equal to the comparison data refers to the pulse count being equal to the interval value selected.

According to one preferred embodiment of this present invention, the step of selecting one of the interval values comprises sequentially selecting one of the interval values among the interval values.

According to one preferred embodiment of this present invention, the interval values of the comparison data is determined upon a rate, and the interval value is adjustable, so as to adjust the length of interval between adjacent pulses of the target pulse signal.

According to one preferred embodiment of this present invention, the comparison data includes a plurality of interval values. The step of comparing the pulse count and the comparison data is to select one of the interval values (e.g. selecting one by one) until the pulse count equals the comparison data, which means the pulse count is equal to the interval value that is selected. Meanwhile, providing each of the interval values for the comparison data according to a rate, where the interval values are adjustable, so as to adjust the time spacing between the target pulse signals and adjacent target pulse signal.

The present invention visually provides a rate multiplication method which determines a pulse count and a pulse interval of the target pulse signal. In other words, a set of comparison data including a plurality of interval values, where a sum of which being the denominator m of a rate n/m and the quantity of which being the nominator, is provided. Since each the interval value can be freely allocated (as long as the sum is equal to m), each time spacing of the target pulse signal can be determined upon request, so as to completely improve problems in conventional art.

The above is a brief description of some deficiencies in the prior art and advantages of the present invention. Other features, advantages and embodiments of the invention will be

DESCRIPTION OF THE PREFERRED EMBODIMENTS

Figure 1:
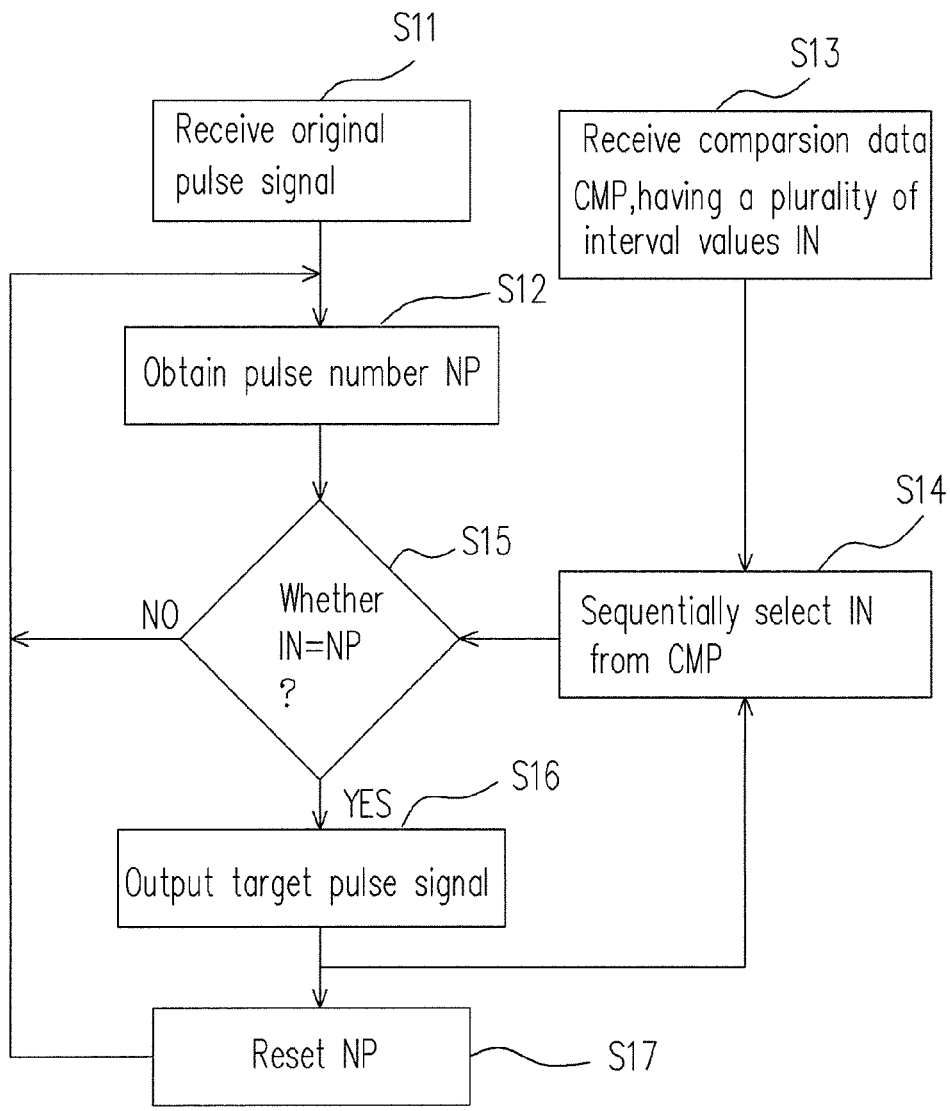
FIG. 1 is a diagram illustrating a flowchart for a rate multiplication method according to a preferred embodiment of the present invention.

Referring to FIG. 1, it is a diagram illustrating a flowchart for a rate multiplication method according to one preferred embodiment of the present invention. In step S11 as shown in FIG. 1, receiving an original pulse signal sequence, than obtaining a pulse count NP (step S12) of the original pulse signal. Meanwhile, a comparison data CMP is received (step S13), which includes a plurality of interval values IN. In step S14, one of the interval values IN is selected (e.g. selected one by one). Comparing the selected interval value IN and the pulse count NP in step S15, if being equal, proceed to step S16, otherwise proceed to compare the interval value IN and the pulse signal NP again. The target pulse signal is outputted in step S16, thereafter step S14 and S17 are deployed at the same time, that is to select (e.g. selecting one by one) a next interval value IN (step S14), and resetting the pulse count NP for recounting (S17). When the step S17 and S14 are completed, steps S12 and S15 are implemented, repeating accordingly.

Another preferred embodiment of the present invention provides a rate multiplication method, including (1) receiving a first signal array, the period of which is M; (2) receiving a rate multiplication signal N, where N is smaller than M; (3) based on a reference data table, selecting a $N1^{th}$ signal, a N2th signal, . . . , and a $Nn^{th}$ signal out of every M signal in the first signal array; and (4) outputting a second signal array, which is composed of the selected $N1^{th}$ signal, N2th signal, . . . , and $Nn^{th}$ signal. Wherein the reference data table is a table for providing the values of N1, N2, . . . , and Nn for each possible combination of M and N. Wherein, a selecting signal X could be also received when the rate multiplying signal N is received, and X indicates which combination of N1, N2, . . . Nn to use when there is Y combinations of N1, N2, . . . , Nn in the reference data table upon M—N combination, where X is not larger than Y. It is surely that a modifying message can be further received for modifying content of the reference data table for user's convenient.

Figure 2:
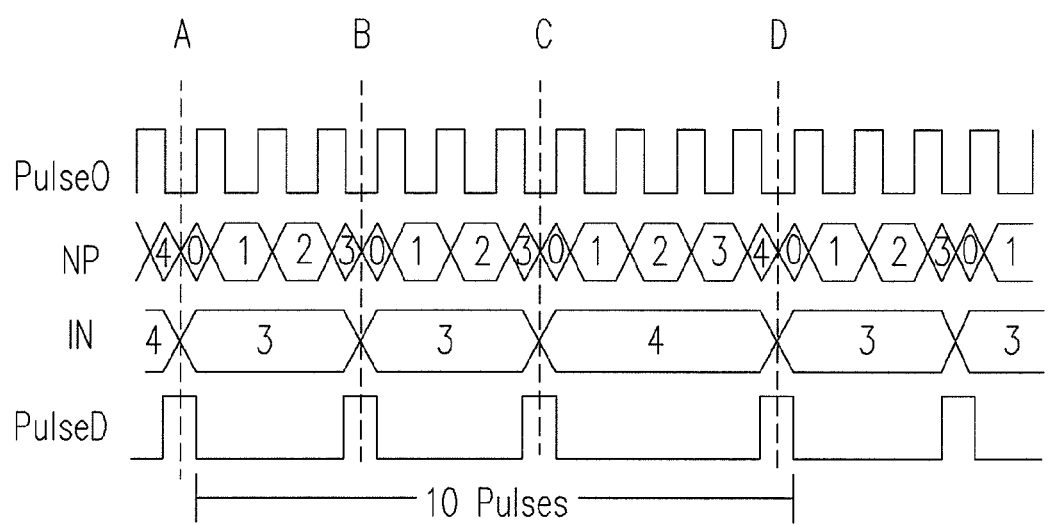
FIG. 2 is a diagram illustrating signal timing according to a preferred embodiment of the present invention.

In order to describe present invention in detail, a rate 3/10 is exemplary along with FIG. 1. FIG. 2 is a diagram illustrating signal timing according to one preferred embodiment of the present invention. Referring to FIGS. 1 and 2 herein, the frequency of the original pulse signal sequence is multiplied by the rate in this preferred embodiment, for example, the rate being 3/10. Visually, three out of every ten pulse signals are selected from the original pulse signal sequence (to be the target pulse signal to output). However, in order to determine which three out of ten to be selected, the selecting method is associated with the time spacing between adjacent pulses. A set of 3, 3, 4 interval values is exemplary for describing this preferred embodiment herein. The interval values can be allocated freely, as long as the quantity of interval values is equal to the numerator of the rate, and the sum of all the interval values is equal to the denominator of the rate.

Referring to FIG. 2, at time A the pulse count NP is counted from zero up, where pulses of the original pulse signal sequence Pulse0 is counted (10 original pulse signals are in a period herein). A first interval IN (i.e. 3) is selected from the comparison data CMP. When the pulse count NP is equal to the interval value IN (i.e. three original pulse signals are counted), a target pulse signal PulseD is promptly outputted (i.e. outputting the third original pulse signal), and pulse count NP is reset and recounted (at time B in the figure). As resetting and recounting the pulse count NP, a next interval value IN is subsequently selected from the comparison data CMP (being 3 in this example). As described above, the pulse count NP is equal to the interval value IN (i.e. three original pulse signals are counted), a target pulse signal PulseD is outputted (i.e. the sixth original pulse signal is outputted) at time C in the figure. A next interval value IN is subsequently selected (being 4 in this example). The pulse count NP is again reset and recounted original pulse signal Pulse0, till the pulse count NP is equal to interval value IN again (i.e. 4 more original pulse signals are counted, and the tenth original pulse signal is outputted) at time D in the figure. Repeatedly implementing the above steps completes rate multiplication thereby.

In this preferred embodiment a rate 3/10 and interval values 3, 3, 4 are exemplary, yet the numerator and the denominator of the rate can be setup randomly upon user's choice (i.e. this present invention applies to different denominator and numerator). The time spacing between the target pulse signal is upon user's setup as well. Thus the scope of the present invention is not limited to the description according to the preferred embodiment herein.

Figure 3:
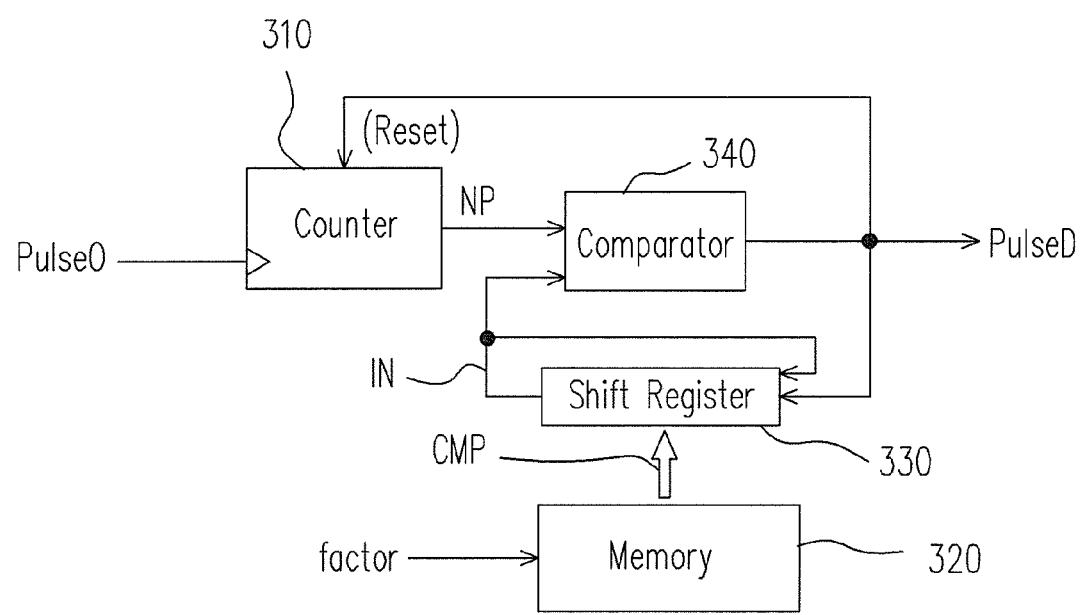
FIG. 3 is a block diagram illustrating a rate multiplier according to a preferred embodiment of the present invention.

In the below steps, a block diagram illustrating a circuit according to a preferred embodiment is described for this present invention. Referring to FIG. 3, it is a block diagram illustrating a rate multiplier according to one preferred embodiment of the present invention. Wherein a counter 310 receives and outputs the pulse count NP as original pulse signal sequence Pulse0 triggers for progressively counting from an initial value, which is zero, for example. The counter 310 also receives the target signal PulseD so as to reset and recount the pulse count NP. A memory 320 records a plurality of sets of comparison data, each set of which is obtained according to various rates. Take rate 3/10 as an example, a set of 3, 3, 4, or 1, 5, 4, is valid for a set of comparison data CMP. Or if a rate being 5/16 is the resulting multiplication, then each combination of interval values (e.g. 3, 3, 3, 3, 4, or 1, 2, 3, 4, 6) are stored in the memory 320 beforehand. The memory 320 selects one set of comparison data according to selecting signal factor, and outputs the selected comparison data CMP, wherein the memory 320 can be combined with the shift register 330 (e.g. built-in memory in the shift register 330). That is, in the preferred embodiment of the present invention, the original pulse signal sequence Pulse0 is received and the selecting signal factor is selected for the original pulse signal Pulse0 transforming to the target pulse signal PulseD upon user's request. It s surely that the comparison data in the shift register 330 can be modified according to an external signal for user's convenience.

The shift register 330 receives and stores the selected comparison data CMP, and sequentially outputs one of the interval values IN as the target pulse signal PulseD triggers. As the shift register outputs the interval value IN, the interval value IN is rotationally shifted to the tail of the comparison data CMP sequence. For example, if the comparison data being 1, 2, 3, 4, 6, then after outputting the interval value 1 the comparison data becomes 2, 3, 4, 6, 1. The selecting method for each interval value IN of the comparison data as described above is only an example of this preferred embodiment. For the skill in the art, it is obvious that other implementation also applies if result is identical to this preferred embodiment. The comparator 340 also receives the pulse count NP and compares which with the interval value IN, if being equal, the target pulse signal PulseD is outputted.

Figure 4:
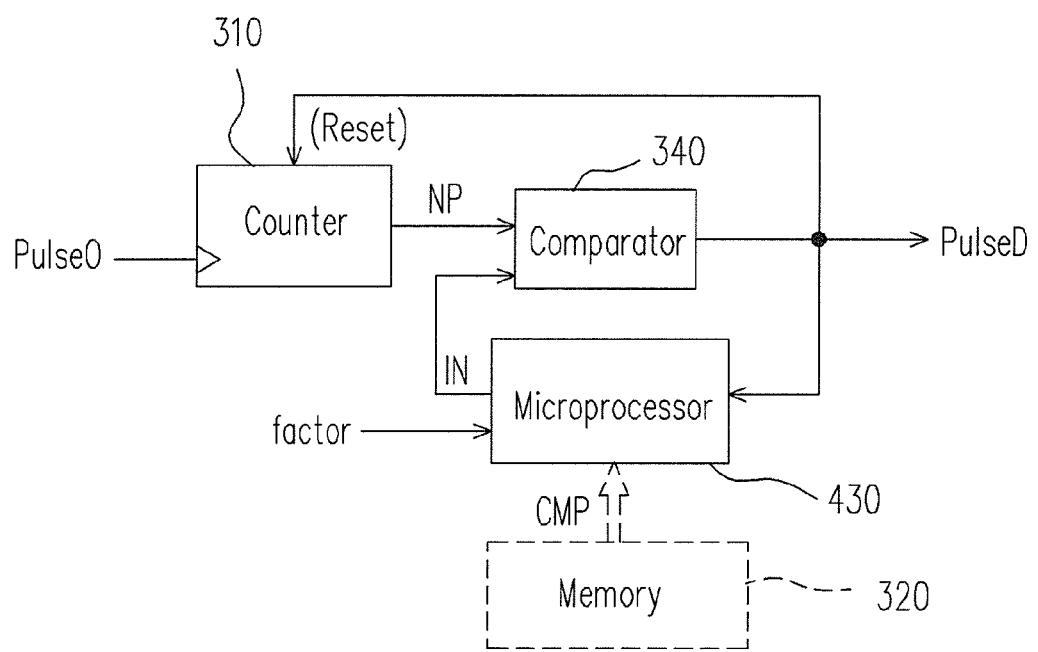
FIG. 4 is a block diagram illustrating a rate multiplier according to another preferred embodiment of the present invention.

Another preferred embodiment is described as follows for this present invention. Referring to FIG. 4, it is a block diagram illustrating a rate multiplier according to another preferred embodiment of the present invention. This preferred embodiment is similar to the previous preferred embodiment, yet a microprocessor replaces the shift register 330 therein. The microprocessor 430 manages to provide control functions based on built-in firmware, where a memory is usually built-in (not illustrated), so that sets of comparison data CMP are stored beforehand. The microprocessor receives selecting signal factor and selects one set of the comparison data CMP, so as to sequentially output each the selected interval value IN among the comparison data CMP as the target pulse signal PulseD triggers. In this preferred embodiment, the sets of comparison data CMP can also be stored in the memory 320 which serves selected comparison data CMP according to the microprocessor 430. Other parts of this preferred embodiment that is not described is identical to that in the previous preferred embodiment, thus is omitted herein.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A rate multiplication method, for generating a target pulse signal by transforming an original pulse signal sequence according to a rate n/m, the rate multiplication method comprising:
    receiving the original pulse signal sequence;
    receiving a comparison data including a plurality of interval values, wherein a quantity of the interval values is equal to a numerator of the rate n/m, and a sum of the interval values is equal to a denominator of the rate n/m; and
    generating the target pulse signal by selectively outputting n pulses from every m pulses of the original pulse signal sequence according to the interval values, wherein length of interval between adjacent pulses of the target pulse signal is integral multiple of that of the original pulse signal,
    wherein a difference between the maximal and the minimal interval values exceeds one.

2. The rate multiplication method as recited in claim 1, wherein the length of interval between adjacent pulses of the target pulse signal is determined according to the interval values.

3. The rate multiplication method as recited in claim 1, wherein the comparison data is selected from a plurality of sets of comparison data according to the rate n/m.

4. The rate multiplication method as recited in claim 3, wherein each of the sets of comparison data provides interval values for a possible combination of n and m.

5. The rate multiplication method as recited in claim 4, wherein the comparison data is selected further according to a selecting signal.

6. The rate multiplication method as recited in claim 4, further comprising receiving a modifying signal for modifying the sets of comparison data under the same rate n/m.

7. The rate multiplication method as recited in claim 1, wherein a pulse width of the target pulse signal is substantially equal to that of the original pulse signal sequence.

8. A rate multiplication method, for counting an original pulse signal sequence and outputting a target pulse signal according to a rate n/m, comprising:
    receiving a comparison data comprising a plurality of interval values, wherein a quantity of the interval values is equal to a numerator of the rate n/m, a sum of the interval values is equal to a denominator of the rate n/m, and a difference between the maximal and the minimal interval values exceeds one;
    receiving the original pulse signal sequence;
    counting the original pulse signal sequence, for obtaining a pulse count; and
    selecting one of the interval values and comparing with the pulse count, when the pulse count is equal to the interval value selected, comprising:
        outputting part of the original pulse signal sequence corresponding to the interval value selected as the target pulse signal, and
        resetting and recounting the pulse count, for obtaining the pulse count and corresponding the target pulse signal again,
    wherein length of interval between adjacent pulses of the target pulse signal is integral multiple of that of the original pulse signal.

9. The rate multiplication method as recited in claim 8, wherein the step of selecting one of the interval values comprises sequentially selecting one of the interval values among the interval values.

10. The rate multiplication method as recited in claim 8, wherein the interval values of the comparison data are determined upon the rate n/m, and the interval value are adjustable, so as to adjust the length of the interval between adjacent pulses of the target pulse signal under the same rate n/m.

11. The rate multiplication method as recited in claim 8, wherein a pulse width of the target pulse signal is substantially equal to that of the original pulse signal sequence.

* * * * *